(12) United States Patent
Werner et al.

(10) Patent No.: US 10,033,284 B2
(45) Date of Patent: Jul. 24, 2018

(54) POWER SUPPLY WITH POWER FACTOR CORRECTION AND OUTPUT-REFERENCED ENERGY RESERVOIR

(71) Applicant: Power Integrations, Inc., San Jose, CA (US)

(72) Inventors: Antonius Jacobus Johannes Werner, Cambridge (GB); David Michael Hugh Matthews, Los Gatos, CA (US); Balu Balakrishnan, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 75 days.

(21) Appl. No.: 15/179,125

(22) Filed: Jun. 10, 2016

(65) Prior Publication Data
US 2017/0358989 A1 Dec. 14, 2017

(51) Int. Cl.
*H02M 3/335* (2006.01)
*H02M 1/08* (2006.01)
*H02M 1/42* (2007.01)
*H05B 33/08* (2006.01)
*H02M 1/00* (2006.01)

(52) U.S. Cl.
CPC ......... *H02M 3/33523* (2013.01); *H02M 1/08* (2013.01); *H02M 1/42* (2013.01); *H02M 1/4258* (2013.01); *H05B 33/0815* (2013.01); *H02M 2001/0009* (2013.01); *Y02B 70/126* (2013.01)

(58) Field of Classification Search
CPC ...... H02M 3/33523; H02M 1/08; H02M 1/42; H02M 2001/0009; H02M 1/4258
See application file for complete search history.

(56) References Cited

U.S. PATENT DOCUMENTS

| 4,443,839 A | * | 4/1984 | Onodera | ........... H02M 3/33523 331/112 |
| 4,641,229 A | * | 2/1987 | Easter | ............... H02M 3/33523 363/21.18 |

(Continued)

FOREIGN PATENT DOCUMENTS

JP 2000125547 4/2000

OTHER PUBLICATIONS

European Pat. App. No. 17173457.7—Extended European Search Report dated Oct. 17, 2017, 8 pages.

*Primary Examiner* — Nguyen Tran
*Assistant Examiner* — Lakaisha Jackson
(74) *Attorney, Agent, or Firm* — Christensen O'Connor Johnson Kindness PLLC

(57) ABSTRACT

An ac-dc power supply includes a dc-dc converter coupled to an input of the ac-dc power supply. The input of the ac-dc power supply is coupled to receive an ac input voltage and an ac input current. The dc-dc converter includes a regulated output and a reservoir output. A controller is coupled to receive sense signals from the dc-dc converter. The controller is coupled to control the dc-dc converter to regulate the regulated output in response to the sense signals. The controller is further coupled to control a waveform of the ac input current to have a substantially same shape as a waveform of the ac input voltage. A regulator circuit is coupled to the regulated output and the reservoir output. The controller is coupled to the regulator circuit to control a transfer of energy from the reservoir output to the regulated output through the regulator circuit.

39 Claims, 8 Drawing Sheets

(56) References Cited

U.S. PATENT DOCUMENTS

| | | | | |
|---|---|---|---|---|
| 5,646,832 A | * | 7/1997 | Pulhamus, Jr. | H02M 1/4208 |
| | | | | 363/133 |
| 6,115,267 A | | 9/2000 | Herbert | |
| 6,144,564 A | | 11/2000 | Fraidlin et al. | |
| 7,505,288 B2 | | 3/2009 | Duvnjak | |
| 8,687,382 B2 | * | 4/2014 | Chen | H02M 1/4258 |
| | | | | 363/16 |
| 2013/0114308 A1 | * | 5/2013 | Liao | H02M 3/33507 |
| | | | | 363/21.01 |
| 2014/0112029 A1 | * | 4/2014 | Lin | H02M 1/15 |
| | | | | 363/21.12 |
| 2014/0210433 A1 | * | 7/2014 | Rutkowski | G05F 1/618 |
| | | | | 323/271 |
| 2014/0232366 A1 | * | 8/2014 | Lawson | H02J 3/32 |
| | | | | 323/282 |
| 2014/0252973 A1 | | 9/2014 | Liu | |
| 2014/0346874 A1 | * | 11/2014 | Fang | H02M 3/33523 |
| | | | | 307/31 |
| 2015/0078041 A1 | * | 3/2015 | Huang | H02M 1/4258 |
| | | | | 363/21.18 |

* cited by examiner

POWER SUPPLY WITH POWER FACTOR CORRECTION AND OUTPUT-REFERENCED ENERGY RESERVOIR

BACKGROUND INFORMATION

Field of the Disclosure

The present invention relates generally to power supplies, and more specifically, the invention relates to power supplies configured to operate with a relatively high power factor from an ac input voltage.

Background

In a typical switched-mode power supply application, an ac-dc power supply receives an input that is nominally between 100 and 277 volts rms (root mean square) from a utility power source. The ac input voltage varies as a sinusoid with a period corresponding to a frequency that is nominally either 50 Hz or 60 Hz in different regions of the world. Switches in the power supply are switched on and off by a control circuit at a rate that is typically more than one thousand times greater than the frequency of the ac input voltage to provide a regulated output that may be suitable for providing current to, for example, a light emitting diode (LED) load for illumination. Although LED loads will predominantly be used as example loads in this disclosure, it is appreciated that there are many other types of loads that require either a constant voltage or a constant current or a combination of both constant voltage and constant current output characteristic—such as, for example, batteries in mobile electronics products that could benefit from the teachings of the present invention. In typical applications, variations in the constant output voltage or constant output current caused by changes in load, temperature, or input voltage are undesirable. It is desired to have a regulated output so that the voltage or current that is being regulated remains relatively constant relative to changes in load, input voltage, temperature, etc. In the case of an LED load, constant current output is desired to ensure that the LEDs provide illumination at a relatively constant intensity. With a relatively constant output current, the ac-dc power supply provides relatively constant output power to the LED load as the voltage across the LED string would be relatively constant. Since the ac input voltage will not naturally provide energy at a constant rate during a sinusoidal ac line period, the power supply must have an energy storage capability that allows it to take energy from the input at a non-constant rate and deliver it to the output at a constant rate. Typically, the energy is stored as the rectified input voltage on a storage capacitor at the input to the power conversion stage. However, in this configuration the storage capacitor draws most of its current from the ac input at the peak of the ac voltage, increasing the rms input current and generating line frequency harmonics that are undesirable in many applications.

An ac-dc power supply that provides regulated current to LEDs typically must meet requirements for power factor, efficiency, and possibly galvanic isolation as explained below. Designers are challenged to provide satisfactory solutions at the lowest cost.

The utility power source provides an ac voltage that has a waveform conforming to standards of magnitude, frequency, and harmonic content to an electrical outlet. The current drawn from the outlet, however, is determined by the characteristics of the power supply that receives the ac voltage. An ideal current waveform will match the waveform of the voltage from the outlet, and the two will cross zero at the same time. In other words, the waveform of the ideal input current will be proportional to the waveform of the input voltage. A measure of how closely the current drawn from the outlet matches the ac voltage waveform is power factor. In any complete period of the ac input voltage, the ideal current will have an rms value that is equal to the value of the average power from the outlet divided by the rms value of the voltage. A power factor of 100% is ideal. In other words, the product of the rms voltage and the rms current will be equal to the power from the outlet when the current has ideal characteristics. Power supplies for LEDs, for example, typically must include power factor correction to meet regulatory requirements. A power supply that does not include power factor correction might have a power factor less than 50%, whereas a power factor greater than 90% is typically required to meet the standards for input current.

Safety agencies generally require the power supply to provide galvanic isolation between input and output. Galvanic isolation prevents dc current between input and output of the power supply. In other words, a high dc voltage applied between an input terminal and an output terminal of a power supply with galvanic isolation will produce substantially no dc current between the input terminal and the output terminal of the power supply. The requirement for galvanic isolation is a complication that contributes to the cost of the power supply.

A power supply with galvanic isolation must maintain an isolation barrier that electrically separates the input from the output. Energy must be transferred across the isolation barrier to provide power to the output, and information in the form of feedback signals in many cases is transferred across the isolation barrier to regulate the output. Galvanic isolation is typically achieved with electromagnetic and electro-optical devices. Electromagnetic devices such as transformers and coupled inductors are generally used to transfer energy between input and output to provide output power, whereas either electro-optical devices or electromagnetic devices may be used to transfer signals between output and input to control the transfer of energy between input and output.

A common solution to achieve high power factor for an ac-dc power supply with galvanic isolation uses two stages of power conversion: One stage without a storage capacitor at its input and without galvanic isolation is configured to shape the ac input current to maintain a high power factor, providing an intermediate output voltage across a storage capacitor. The intermediate output voltage is a dc voltage greater than the rectified ac input voltage. The intermediate voltage on the storage capacitor may be hundreds of volts. The intermediate output is the input to a second stage of power conversion that has galvanic isolation and control circuitry to regulate a final output. The output of the first stage typically stores the non-constant energy from the input in the storage capacitor, and then provides the energy to the second stage for delivery at a constant rate to the output. The use of more than one stage of power conversion with high voltage energy storage increases the cost and complexity of the power supply.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
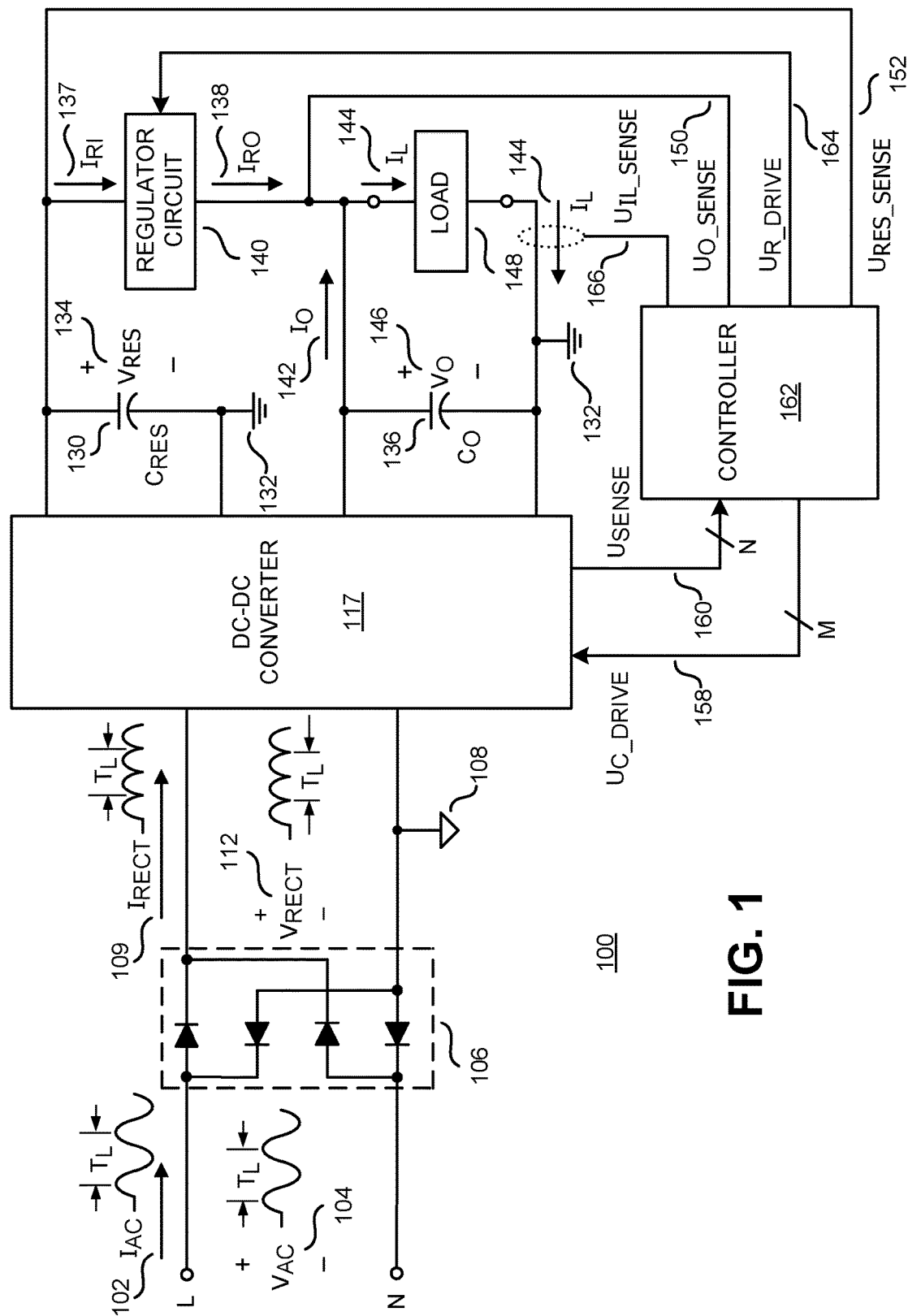
FIG. 1 is a functional block diagram of an example ac-dc power supply with power factor correction including an energy reservoir on an output, in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

The functional block diagram of FIG. 1 shows one example of an ac-dc power supply 100 receiving an ac input voltage $V_{AC}$ 104 that when graphed as a function of time is substantially sinusoidal with a period $T_L$ that is the ac line period. The example power supply of FIG. 1 has an ac input current $I_{AC}$ 102 that when graphed as a function of time has substantially the same shape as the ac input voltage $V_{AC}$ 104.

In the example power supply of FIG. 1, a full-wave bridge rectifier 106 produces a dc rectified input voltage $V_{RECT}$ 112 that is received by a dc-dc converter 117. Rectified input voltage $V_{RECT}$ 112 is positive with respect to an input return 108. Dc-dc converter 117 has a rectified input current $I_{RECT}$ 109 that is substantially the same shape as the rectified input voltage $V_{RECT}$ 112. Dc-dc converter 117 produces a regulated output voltage $V_O$ 146 that is substantially a constant dc voltage on an output capacitor $C_O$ 136 with respect to an output return 132. Dc-dc converter 117 also produces a regulated load current $I_L$ 144 in a load 148. Dc-dc converter 117 provides galvanic isolation between input return 108 and output return 132. Those skilled in the art will appreciate that galvanic isolation is not necessary to practice the invention, and that input return 108 and output return 132 may be coupled to a common node in applications where galvanic isolation is not required. Dc-dc converter 117 also produces a reservoir output voltage $V_{RES}$ 134 on a reservoir capacitor $C_{RES}$ 130 with respect to the output return 132. Storing energy on a reservoir capacitor $C_{RES}$ 130 on the output of a power supply at a voltage lower than the input voltage $V_{RECT}$ 112 requires less energy to be stored for power factor correction than would be required if the energy were stored at the higher voltage. The lower voltage at the output may allow the use of capacitor technologies with higher energy densities. Also, components may be placed closer together at lower voltages. As a result, the power supply occupies less volume, increasing the density of packaging while providing smaller variations in the regulated output compared to conventional solutions. Dc-dc converter 117 may be any one of various switched-mode power converters that are known by those skilled in the art to provide galvanically isolated or non-isolated outputs and power factor correction.

In the example power supply of FIG. 1, load 148 conducts a regulated load current $I_L$ 144 that corresponds to a regulated output voltage $V_O$ 146. The load 148 may include for example light emitting diodes (LEDs) for illumination or another form of electrical load. Load current $I_L$ 144 is the sum of an output current $I_O$ 142 from the regulated output voltage $V_O$ 146 and a regulator circuit output current $I_{RO}$ 138 from a regulator circuit 140 that conducts a regulator circuit input current $I_{RI}$ 137 from the reservoir output voltage $V_{RES}$ 134.

A controller 162 in the example power supply of FIG. 1 may receive signals from the input and from the output of the power supply to maintain the input current $I_{AC}$ 102, the output voltage $V_O$ 146, and the load current $I_L$ 144 within desired limits of operation. The example of FIG. 1 illustrates that controller 162 may receive a plurality of N sense signals included in signal bus $U_{SENSE}$ 160 from dc-dc converter 117.

It is appreciated that controller 162 may be configured to have a plurality of N sense signal inputs that receive a plurality of sense signals not necessarily included in a bus. Controller 162 may also receive an output voltage sense signal $U_{O\_SENSE}$ 150, a load current sense signal $U_{ILSENSE}$ 166, and an optional reservoir voltage sense signal $U_{RES\_SENSE}$ 152.

The example of FIG. 1 also illustrates that controller 162 may provide a plurality of M drive signals included in signal bus $U_{C\_DRIVE}$ 158 to dc-dc converter 117. It is appreciated that controller 162 may be configured to provide a plurality of M sense signals from a plurality of signal outputs not necessarily included in a bus. Controller 162 may also provide a regulator circuit drive signal $U_{R\_DRIVE}$ 164 to regulator circuit 140 that receives reservoir output voltage $V_{RES}$ 134. Drive signals and sense signals may be either voltages or currents.

Techniques for control of dc-dc converters to provide regulated outputs and power factor correction are well known and widely used in the art. Controller 162 typically changes the on-times and off-times of switches within dc-dc converter 117 to regulate an output voltage $V_O$ 146, an output current $I_O$ 142, a load current $I_L$ 144, or a combination of output quantities. Controller 162 may change on-times and off-times of switches within dc-dc converter 117 to shape the rectified current $I_{RECT}$ 109 so that the input to the ac-dc power supply may operate with a relatively high power factor. Controller 162 must change the magnitude of the rectified input current $I_{RECT}$ 109 so that the average input power within each half line period is sufficient to provide the power required by the load 148 plus power lost in the power conversion circuits. Controller 162 may also provide a regulator circuit drive signal $U_{R\_DRIVE}$ 164 to regulator circuit 140 that receives regulator circuit input current $I_{RI}$ 137 from reservoir output voltage $V_{RES}$ 134 and delivers regulator circuit output current $I_{RO}$ 138 to the load 148. Regulator circuit drive signal $U_{R\_DRIVE}$ 164 is optional, and may not be required in applications where it is acceptable to control output voltage $V_O$ 146 between upper and lower limits that are sufficiently far apart, as will be explained in further detail later in this disclosure.

Figure 2:
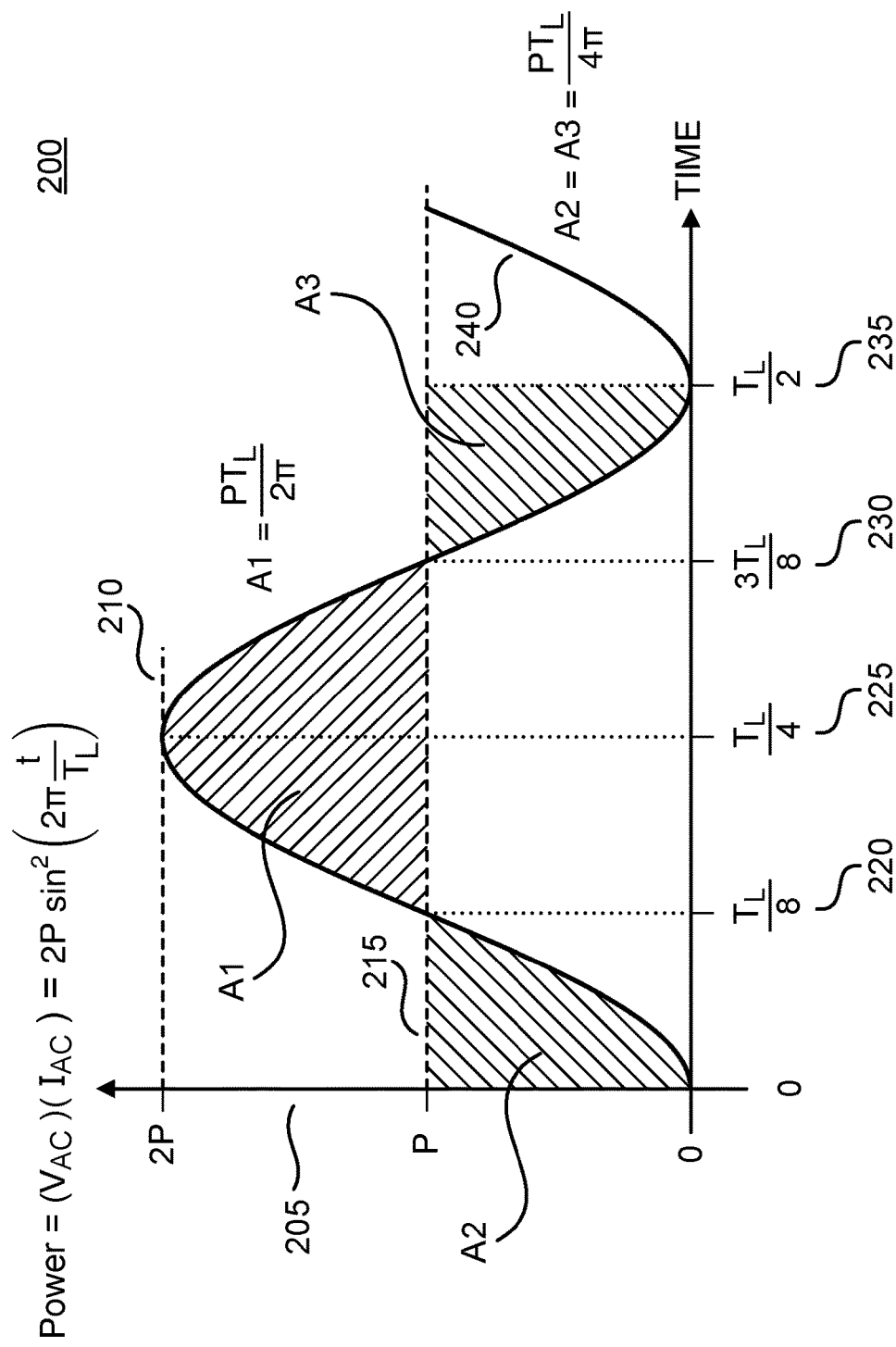
FIG. 2 is a graph that shows the input power as a function of time for the example ac-dc power supply of FIG. 1, in accordance with the teachings of the present invention.

The example ac-dc power supply of FIG. 1 uses an output-referenced energy reservoir to store energy from the input for delivery at a constant rate to a regulated output. The graph 200 of FIG. 2 illustrates the power and energy received at the input of the example ac-dc power supply 100 in FIG. 1 for a duration that includes one half of one line period $T_L$. The curve 240 shows the input power as it changes with time. The horizontal axis shows the time after a zero-crossing of the ac input voltage $V_{AC}$ 104, the time marked in fractions of the line period $T_L$ after the zero-crossing. The area between the curve 240 and the horizontal axis represents the energy received by the example ac-dc power supply 100. The instantaneous power plotted on the vertical axis 205 of graph 200 is the product of the ac input voltage $V_{AC}$ 104 and ac input current $I_{AC}$ 102. Assuming negligible voltage drop across the full-wave bridge rectifier 106, the graph also represents the product of the rectified input voltage $V_{RECT}$ 112 and the rectified input current $I_{RECT}$ 109 received by the dc-dc converter 117.

The graph 200 of FIG. 2 shows that the average input power P 215 is half the peak power 2P 210. If the power supply (including regulator circuit 140) has no losses, the average input power P 215 is also the output power delivered to the load 148. If the power supply has losses, the average input power P 215 is the output power delivered to the load plus the losses in the power supply.

The graph 200 of FIG. 2 also shows that during some parts of the line period the power supply receives substantially more power than it delivers to the load, and during other parts of the line period the power supply receives substantially less power than it delivers to the load. For example, at the times when the ac input voltage is zero (time zero and time $T_L/2$ in FIG. 2) the power supply receives no power, but one quarter line period later it receives twice the power that it delivers to the load. In terms of energy, the hatched area A1 in FIG. 2 represents the energy the power supply receives in excess of the energy it delivers to the load within the quarter line period between time 220 ($T_L/8$) and time 230 ($3T_L/8$) after a zero crossing. The surplus energy in area A1 is approximately 64% ($2/\pi$) of the energy delivered to the load during that interval. Similarly, the shaded areas A2 and A3 in FIG. 2 represent the energy that the power supply does not receive from the input, but yet must be delivered to the load to maintain a desired output voltage. The sum of the deficit energies represented by shaded areas A2 and A3 is exactly the surplus energy represented by shaded area A1.

The ac-dc power supply of FIG. 1 uses the reservoir capacitor $C_{RES}$ 130 to store the surplus energy from the input and to deliver the surplus energy to the load during the times when there is insufficient energy from the input to meet the demand of the load. From time 220 ($T_L/8$) to time 230 ($3T_L/8$) after a zero crossing of the ac input voltage 104, reservoir capacitor $C_{RES}$ 130 charges as it receives surplus energy from the input. Reservoir capacitor $C_{RES}$ 130 discharges through regulator circuit 140 to deliver the surplus energy to the load 114 during the one eighth line periods before and after a zero crossing of the ac input voltage 104.

Regulator circuit 140 may include either a linear power converter or a switched mode power converter to conduct regulator circuit input current $I_{RI}$ 137 from reservoir voltage $V_{RES}$ 134 and deliver regulator circuit output current $I_{RO}$ 138 to the output capacitor $C_O$ 136 and the load 148. For a linear power converter the regulator circuit input current $I_{RI}$ 137 received by the regulator circuit 140 is the same value as the regulator circuit output current $I_{RO}$ 138 from the regulator circuit 140. For a switched mode power converter the regulator circuit input current $I_{RI}$ 137 received by the regulator circuit 140 may be greater than or less than the regulator circuit output current $I_{RO}$ 138 from the regulator circuit, depending on the difference between the reservoir voltage $V_{RES}$ 134 and the regulated output voltage $V_O$ 146. If the regulator circuit 140 is a linear power converter, the reservoir voltage $V_{RES}$ 134 must be greater than or equal to the regulated output voltage $V_O$ 146 because a linear regular cannot produce a dc output voltage greater than its dc input voltage. If the regulator circuit 140 is a switched mode power converter, the reservoir voltage $V_{RES}$ 134 may be greater than or less than the regulated output voltage $V_O$ 146, depending on the type of switching converter is used for the regulator circuit 140. For example, the reservoir voltage $V_{RES}$ 134 must be greater than the regulated output voltage $V_O$ 146 if the regulator circuit 140 is a buck converter, and the reservoir voltage $V_{RES}$ 134 must be less than the regulated output voltage $V_O$ 146 if the regulator circuit 140 is a boost converter. There are other switched mode converter circuits known by those skilled in the art that may operate in either a buck mode or a boost mode allowing reservoir voltage $V_{RES}$ 134 to be either greater or less that the regulated output voltage $V_O$ 146 during the operation of the power converter. It will be shown later in this disclosure that a regulator circuit 140 may operate as either a linear power converter or a switched mode power converter as appropriate to reduce losses over a range of input voltages and load currents.

Figure 3:
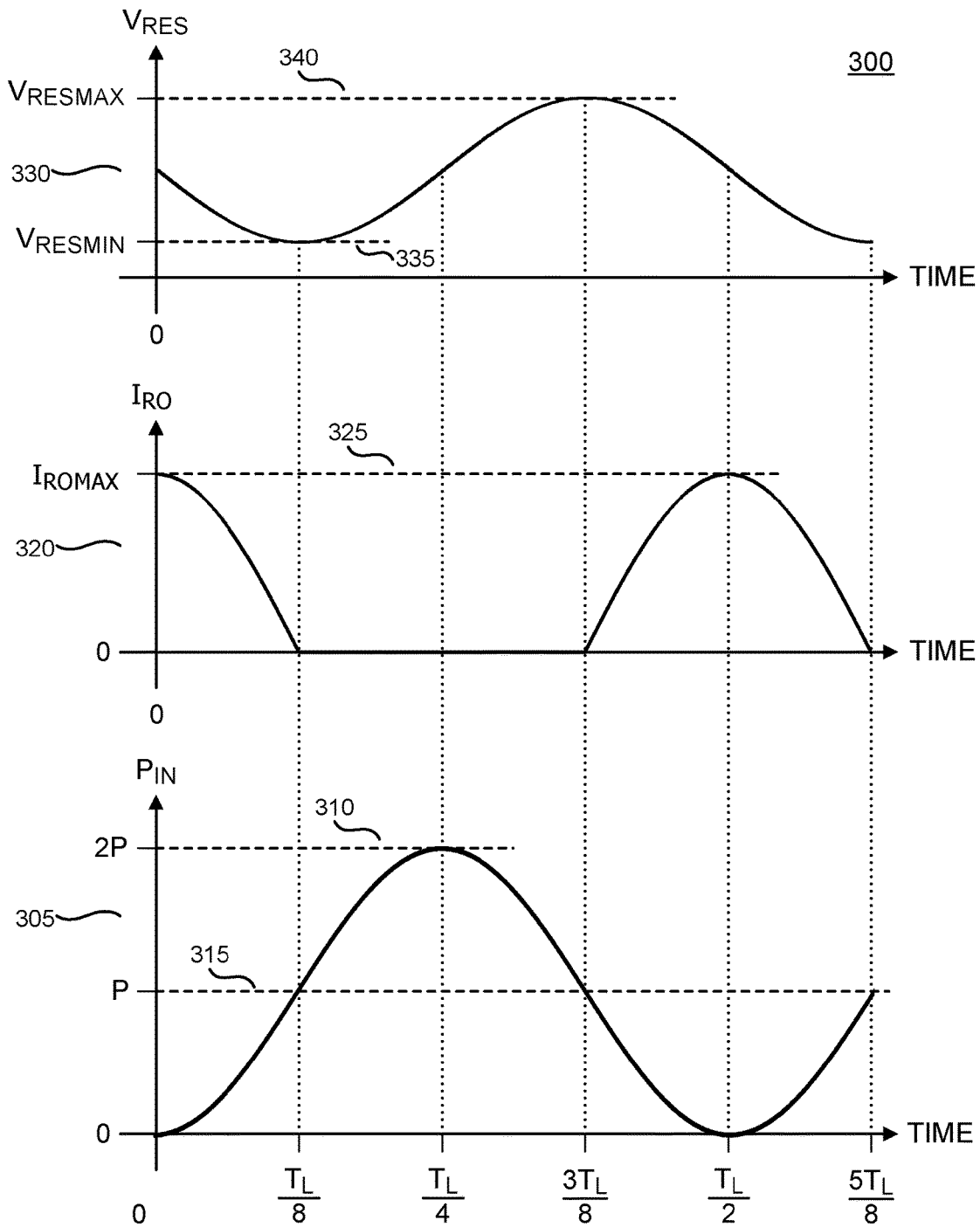
FIG. 3 is a timing diagram illustrating voltage on a reservoir capacitor, current from a regulator circuit, and input power for the example ac-dc power supply of FIG. 1, in accordance with the teachings of the present invention.

FIG. 3 is a timing diagram 300 that shows the salient features of three quantities from the example ac-dc power supply of FIG. 1 in which the regulator circuit 140 is a linear regulator under the control of controller 162 by the optional $U_{R\_DRIVE}$ signal 164. Graphs from an example in which the regulator circuit 140 is a switching regulator circuit would be similar, typically showing relatively small high frequency deviations in amplitude around the average values that would appear as thicker lines in FIG. 3. The switching periods in the high frequency ripple would not be visible on the time scale in the graphs of FIG. 3.

A graph 330 of reservoir voltage $V_{RES}$ 134 and a graph 320 of regulator circuit output current $I_{RO}$ 138 from regulator circuit 140 are shown with a graph 305 of the instantaneous power $P_{IN}$ received at the input of the example ac-dc power supply 100 in FIG. 1. Graph 305 shows that the instantaneous power $P_{IN}$ varies between a minimum value of zero and a maximum value of twice the average input power every half line period as illustrated previously in FIG. 2. The graph 330 of reservoir voltage $V_{RES}$ 134 shows that the voltage on reservoir capacitor $C_{RES}$ 130 varies between a minimum value $V_{RESMIN}$ 335 and a maximum value $V_{RESMAX}$ 340 every quarter line period. The reservoir voltage $V_{RES}$ 134 on the reservoir capacitor $C_{RES}$ 130 is increasing when the instantaneous input power $P_{IN}$ is greater than the average input power P 315. The reservoir voltage $V_{RES}$ 134 on the reservoir capacitor $C_{RES}$ 130 is decreasing when the instantaneous input power is less than the average input power P 315. Graph 320 of regulator circuit output current $I_{RO}$ 138 from regulator circuit 140 shows that the regulator circuit output current is positive when the instantaneous input power $P_{IN}$ is less than the average input power P 315, and is zero otherwise. Regulator circuit output current $I_{RO}$ 138 is a maximum value $I_{ROMAX}$ 325 when the instantaneous input power $P_{IN}$ is zero.

In an example where the regulator circuit drive signal $U_{R\_DRIVE}$ 164 from controller 162 is absent, regulator circuit 140 may be alternatively configured to conduct current when the output voltage $V_O$ 146 falls below a minimum value $V_{OMIN}$ and to stop conducting current when the output voltage $V_O$ 146 rises above a maximum value $V_{OMAX}$. With this optional arrangement (not shown in FIG. 3) for either a linear regulator circuit or a switching regulator circuit, the regulator circuit output current $I_{RO}$ 138 from regulator circuit 140 would be pulsating between zero and a maximum value to give an average value that follows the graph 320, relying on output capacitor $C_O$ 136 to filter the pulsating current to obtain a relatively smooth variation in output voltage $V_O$ 146 between the limits $V_{OMIN}$ and $V_{OMAX}$ that may be used in some applications where a loosely regulated output voltage is acceptable. The following expressions apply to the configuration of FIG. 1 where controller 162 uses regulator circuit drive signal $U_{R\_DRIVE}$ 164 to provide relatively tight regulation of output voltage $V_O$ 146, and the regulator circuit output current $I_{RO}$ 138 from regulator circuit 140 is nonzero when the instantaneous input power $P_{IN}$ is less than the average input power P 315.

For a load 148 that requires a power $P_O$ and a regulator circuit 140 that is a linear regulator, it can be shown that the reservoir voltage $V_{RES}$ 134 is given by the expression $$V_{RES}(t) = V_{RESMIN} + \frac{P_O T_L}{4\pi C_{RES} V_O}\left[1 - \sin\left(4\pi \frac{t}{T_L}\right)\right] \quad (1)$$

for the conditions of $P_{IN} \leq P$, $V_{RESMIN} \geq V_O$), and the time t is measured from the zero-crossing of the ac input voltage as in FIG. 2 and FIG. 3. The maximum reservoir voltage $V_{RESMAXL}$ for the linear regulator circuit is seen to be $$V_{RESMAXL} = V_{RESMIN} + \frac{PT_L}{2\pi C_{RES} V_O} \quad (2)$$

For a regulator circuit that is a linear regulator, the regulator circuit input current $I_{RI}$ 137 received at the input of the regulator circuit is the same as the regulator circuit output current $I_{RO}$ 138 delivered by the regulator circuit. Since the regulator circuit must provide all the current to the load when the ac input voltage is zero, the maximum current $I_{ROMAX}$ 325 from the linear regulator circuit is also the maximum current $I_{RIMAXL}$ received by the linear regulator.

$$I_{RIMAXL} = I_{ROMAX} = \frac{P_O}{V_O} \quad (3)$$

The power $P_{L\_LOSS}$ that is lost in the linear regulator circuit is $$P_{L\_LOSS} = \frac{P_O}{\pi}\left[\frac{V_{RESMIN}}{V_O} + \frac{PT_L}{4\pi C_{RES} V_O^2} - 1\right] \quad (4)$$

from which one can derive the expression for the efficiency of the linear regulator $\eta_L$.

$$\eta_L = \frac{1}{\frac{V_{RESMIN}}{V_O} + \frac{P_O T_L}{4\pi C_{RES} V_O^2}} \quad (5)$$

The expression shows that the efficiency of the linear regulator reduces for higher values of $V_{RESMIN}$, so it is desirable to set $V_{RESMIN}$ as close as possible to $V_O$. For a regulator circuit 140 that is a switching regulator with an efficiency $\eta_S$ where $0 \leq \eta_S \leq 1$, it can be shown that the reservoir voltage $V_{RES}$ 134 is given by the expression $$V_{RES}(t) = \sqrt{V_{RESMIN}^2 + \frac{P_O T_L}{2\pi C_{RES} \eta_S}\left[1 - \sin\left(4\pi \frac{t}{T_L}\right)\right]} \quad (6)$$

for the condition $P_{IN} \leq P$, and the time t is measured from the zero-crossing of the ac input voltage. The maximum reservoir voltage $V_{RESMAXS}$ is then given by the expression $$V_{RESMAXS} = \sqrt{V_{RESMIN}^2 + \frac{P_O T_L}{\pi C_{RES} \eta_S}} \quad (7)$$

The maximum reservoir voltage for a linear regulator circuit would typically be greater than the maximum reservoir voltage for a switching regulator because a linear regulator typically has greater power loss than a switching regulator. The maximum regulator circuit output current $I_{RO}$ 138, $I_{ROMAX}$ 325, from the switching regulator circuit is the same as from the linear regulator circuit because both must provide the same power when the input voltage is at zero. Since the maximum current $I_{RI}$ 134 received by the switching regulator circuit $I_{RIMAXS}$ depends on the reservoir voltage $V_{RES}(t)$ there is no closed form expression for $I_{RIMAXS}$. The maximum current $I_{RIMAXS}$ received by the switching regulator circuit is typically not the same as the maximum current $I_{RIMAXL}$ received by the linear regulator circuit. A switching regulator adjusts its input current in response to the input voltage to match the output power, whereas the input current of a linear regulator cannot be less than its output current. If the dc-dc converter 117 had no losses besides those associated with the regulator circuit 140, the efficiency $\eta_{TL}$ of the of the total system measured at the input of the dc-dc converter 117 would be for a linear regulator $$\eta_{TL} = \frac{1}{1 + \frac{1}{\pi}\left(\frac{1}{\eta_L} - 1\right)} = \frac{1}{1 + \frac{1}{\pi}\left[\frac{V_{RESMIN}}{V_O} + \frac{PT_L}{4\pi C_{RES} V_O^2} - 1\right]} \quad (8)$$

The efficiency $\eta_{TS}$ of the total system with a switching regulator and no other losses would be $$\eta_{TS} = \frac{1}{1 + \frac{1}{\pi}\left(\frac{1}{\eta_S} - 1\right)} \quad (9)$$

In general, for a system that has a dc-dc converter and a reservoir output with a regulator circuit having respective efficiencies $\eta_{DC}$ and $\eta_{REG}$, the efficiency of the total system is given by the expression $$\eta_T = \frac{\eta_{DC}}{1 + \frac{1}{\pi}\left(\frac{1}{\eta_{REG}} - 1\right)} \quad (10)$$

The expression suggests that it may be advantageous to use a switching regulator instead of a linear regulator when the efficiency of the switching regulator circuit is greater than the efficiency of the linear regulator circuit. Designers may use the above expressions to choose values for the reservoir capacitor $C_{RES}$ 130, to set the minimum reservoir voltage $V_{RESMIN}$, and to make choices for the regulator circuit 140.

Figure 4:
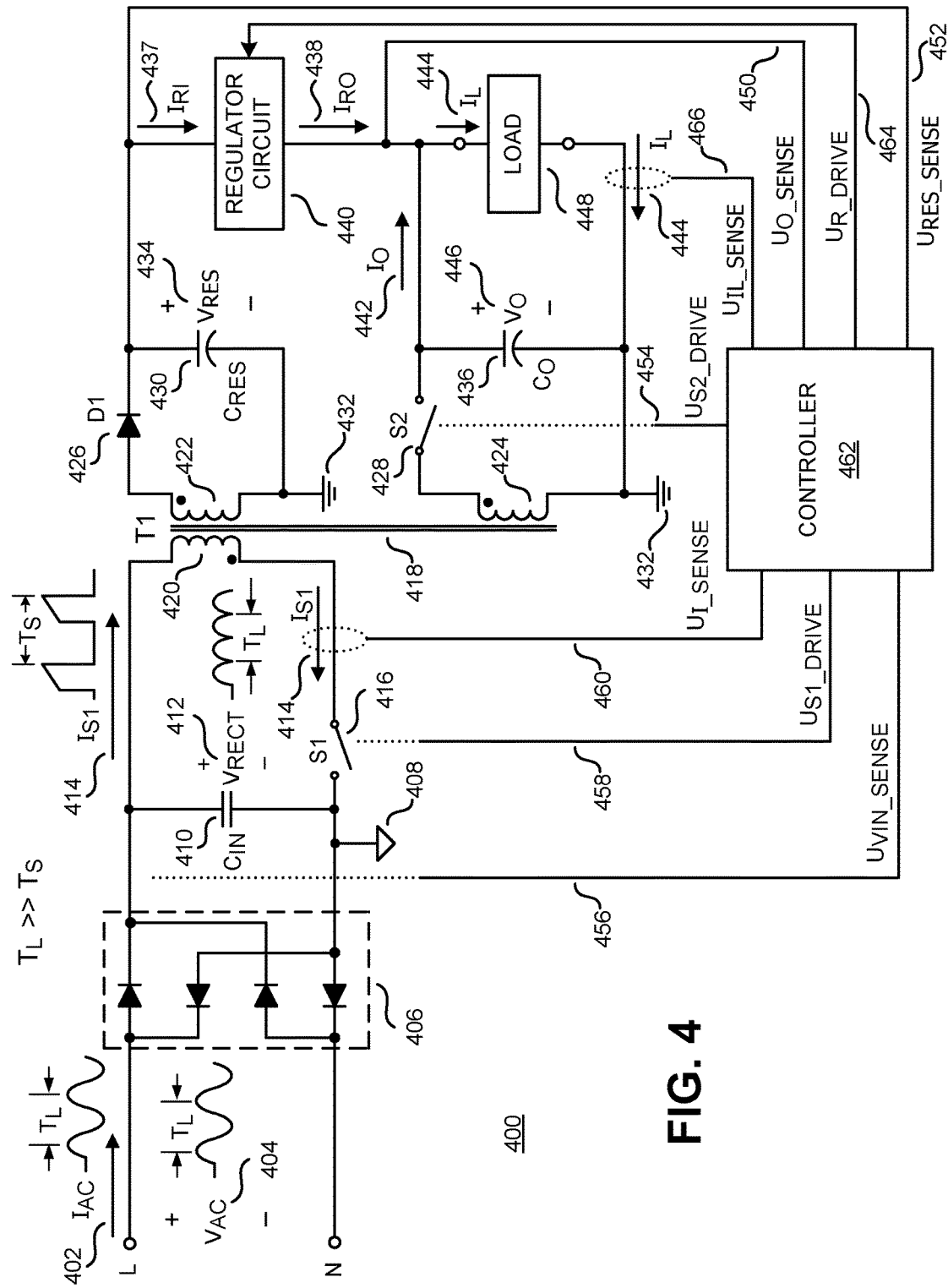
FIG. 4 is a schematic diagram showing the salient features of an example ac-dc power supply that includes a flyback converter, in accordance with the teachings of the present invention.

FIG. 4 is a schematic diagram showing the salient features of an example ac-dc power supply 400 with power factor correction and galvanic isolation that includes a flyback converter and an output with an energy reservoir. The example power supply of FIG. 4 provides further detail of the ac-dc power supply described in FIG. 1.

The example power supply of FIG. 4 receives an ac input current $I_{AC}$ 402 that is substantially the same shape as an ac input voltage $V_{AC}$ 404. A full-wave bridge rectifier 406 produces a dc rectified input voltage $V_{RECT}$ 412 that is received by a dc-dc converter known in the art as a flyback converter. Dc rectified input voltage $V_{RECT}$ 412 is positive with respect to an input return 408. The flyback converter in FIG. 4 includes an energy transfer element T1 418 that is sometimes referred to as a transformer or as a coupled inductor. Energy transfer element T1 418 in the flyback converter of FIG. 4 transfers energy from the input to the outputs while providing galvanic isolation between the input and the outputs.

The energy transfer element T1 418 of the flyback converter in the example ac-dc power supply of FIG. 4 has an input winding 420, a first output winding 424 and a second output winding 422. Input winding 420 is sometimes referred to as the primary winding. One end of input winding 420 is coupled to receive dc rectified input voltage $V_{RECT}$ 412. An input switch S1 416 is coupled between the other end of input winding 420 and the input return 408. Input switch S1 416 is sometimes referred to as the primary switch. When input switch S1 416 is closed, input winding 420 may conduct current. When input switch S1 416 is open, input winding 420 cannot conduct current. A drive signal $U_{S1\_DRIVE}$ 458 from controller 462 opens and closes input switch S1 416 to allow input winding 420 to conduct a pulsating dc input current $I_{S1}$ 414 with period $T_S$ that is the switching period. The switching period $T_S$ is much less than the ac line period $T_L$. The switching period $T_S$ is the reciprocal of the switching frequency, and the ac line period $T_L$ is the reciprocal of the ac line frequency. In one example, the switching period $T_S$ is about 15 microseconds whereas the ac line period $T_L$ is about 20 milliseconds. In other words, the ac line period $T_L$ is typically more than 1000 times greater than the switching period $T_S$, so that there are typically more than 1000 switching periods within one ac line period. It is appreciated that in one example, the switching period $T_S$ could be varied over time as a function of the average power required by load 448.

In the example power supply of FIG. 4, a capacitor $C_{IN}$ 410 coupled across the rectified input voltage $V_{RECT}$ 412 from full-wave bridge rectifier 406 provides a low impedance source for the pulses of dc input current $I_{S1}$ 414. Capacitor $C_{IN}$ 410 filters the high frequency components of pulsating dc input current $I_{S1}$ 414 such that the magnitude of the ac input current $I_{AC}$ 402 at any instant is substantially the average of the dc input current $I_{S1}$ 414, the average taken over a switching period $T_S$. Capacitor $C_{IN}$ 410 is small enough to allow the rectified input voltage $V_{RECT}$ 412 to become substantially zero twice in every ac line period $T_L$. Controller 462 in the example ac-dc power supply of FIG. 4 senses the rectified input voltage $V_{RECT}$ 412 and the dc input current $I_{S1}$ 414 in input switch S1 416 as input voltage sense signal $U_{VIN\_SENSE}$ 456 and input current sense signal $U_{I\_SENSE}$ 460 respectively. In various examples, input voltage sense signal $U_{VIN\_SENSE}$ 456 and input current sense signal $U_{I\_SENSE}$ 460 may be either a voltage or a current. Controller 462 in the example ac-dc power supply of FIG. 4 provides a drive signal $U_{S1\_DRIVE}$ 458 to open and close input switch S1 416. Drive signal $U_{S1\_DRIVE}$ 458 may be either a voltage or a current.

In the example ac-dc power supply of FIG. 4, an output switch S2 428 coupled to output winding 424 opens and closes in response to an output switch drive signal $U_{S2}$ DRIVE 454 from controller 462 to provide a regulated output voltage $V_O$ 446 to a load 448. In the example ac-dc power supply of FIG. 4, the output voltage $V_O$ 446 is positive with respect to an output return 432 that is galvanically isolated from the input return 408 by energy transfer element T1 418. Output switch drive signal $U_{S2}$ DRIVE 454 may be either a voltage or a current, and is related to input switch drive signal $U_{S1\_DRIVE}$ 458 so that output switch S2 428 is open when input switch S1 416 is closed. Output switch S2 428 may be either open or closed while input switch S1 416 is open.

In the example ac-dc power supply of FIG. 4, controller 462 switches switch S1 such that the ac input current $I_{AC}$ 402 is proportional to the ac input voltage $V_{AC}$ 404 by a factor that is substantially fixed throughout a half line period. In one example, controller 462 may adjust the proportionality factor each half line period in response to the difference between the output voltage $V_O$ 446 and a desired value. In another example, controller 462 may adjust the proportionality factor in response to the voltage $V_{RES}$ 434 on the reservoir capacitor $C_{RES}$ 430. The proportionality factor is adjusted to make the average input power sufficient to provide the demand of the load 448 plus the power lost in the power conversion circuits. During portions of the line period when the instantaneous input power exceeds the demand of the load plus the loss, controller 462 switches output switch S2 428 as required for a switching period $T_S$ to prevent output voltage $V_O$ from exceeding its desired value. When output switch S2 428 on output winding 424 is open, surplus energy from the output produces a current in reservoir output winding 422 and rectifier D1 426 to store the surplus energy in reservoir capacitor $C_{RES}$ 430 that charges to a reservoir voltage $V_{RES}$ 434. In other examples, rectifier D1 426 may be a switch driven by controller 462. In FIG. 4, the output windings 424 and 422 are shown as separate windings electrically coupled at electrical node 432. It is appreciated in other examples, the winding 422 could be ac or dc stacked on winding 424 as will be known to one skilled in the art. In the example of FIG. 4, the reservoir voltage $V_{RES}$ 434 is positive with respect to the output return 432. During portions of the line period when the instantaneous input power is less than the demand of the load plus the loss in the power conversion circuits, regulator circuit 440 receives regulator circuit input current $I_{RI}$ 437 from reservoir voltage 434 to deliver regulator circuit output current $I_{RO}$ 438 that adds to output current $I_O$ 442 to form the load current $I_L$ 444 required by the load 448. In the example of FIG. 4, controller 462 receives a load current sense signal $U_{IL\_SENSE}$ 466 that may be used to regulate the load current $I_L$ 444.

Controller 462 receives an output voltage sense signal $U_{O\_SENSE}$ 450 and optional reservoir voltage sense signal $U_{RES\_SENSE}$ 452. Controller 462 provides an optional regulator circuit drive signal $U_{R\_DRIVE}$ 464. In the example ac-dc power supply of FIG. 4, controller 462 may operate regulator circuit 440 and input switch S1 416 to maintain a minimum reservoir voltage $V_{RESMIN}$ on reservoir capacitor $C_{RES}$ 430. Controller 462 may also temporarily operate input switch S1 416 in a mode that suspends power factor correction while continuing to provide either regulated output voltage $V_O$ 446 or regulated load current $I_L$ 444 when voltage on reservoir capacitor $C_{RES}$ 430 is greater than a maximum value or less than a minimum value. Transient conditions such as for example a high voltage surge on the ac input voltage $V_{AC}$ 404 or for example a sudden change in output current may require a temporary override of the power factor correction feature to prevent either excess voltage or insufficient voltage on reservoir capacitor $C_{RES}$ 430.

Figure 5:
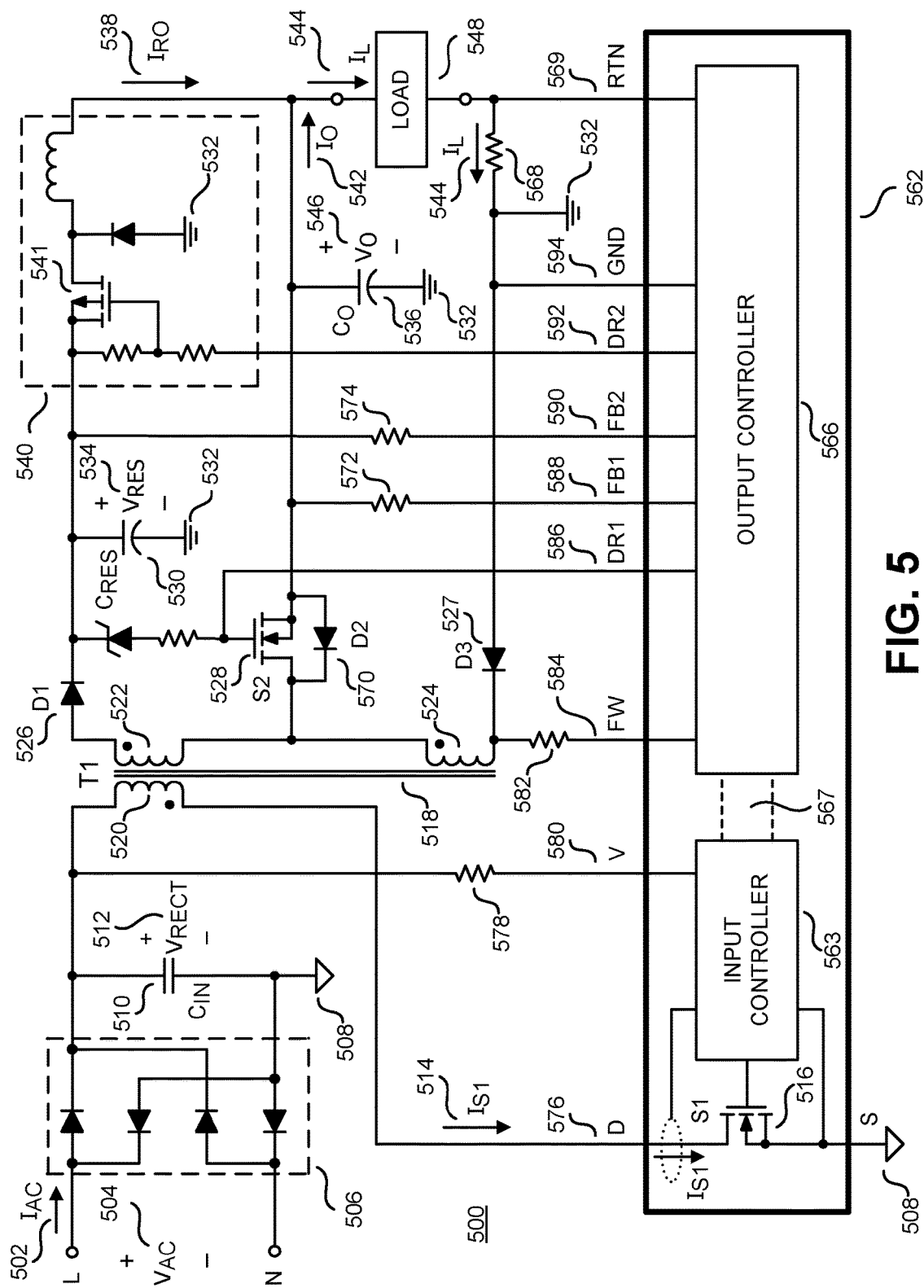
FIG. 5 is a schematic diagram of an example ac-dc power supply that includes a flyback converter showing further details of a controller, a regulator circuit, and switches, in accordance with the teachings of the present invention.

FIG. 5 is a schematic diagram 500 of an example ac-dc power supply that includes a flyback converter showing further details of a controller, a regulator circuit, switches, and sensing circuits. The example ac-dc power supply of FIG. 5 has many of the same features and elements as the example of FIG. 4.

In the example ac-dc power supply of FIG. 5, a full-wave bridge rectifier 506 receives an ac input voltage $V_{AC}$ 504 to produce a dc rectified input voltage $V_{RECT}$ 512 on an input capacitor $C_{IN}$ 510 with respect to an input return 508. As in the example of FIG. 4, capacitor $C_{IN}$ 510 is small enough to allow the rectified input voltage $V_{RECT}$ 512 to become substantially zero twice in every ac line period. Energy transfer element T1 518 may provide galvanic isolation for a dc-dc converter that is a flyback converter having an input winding 520, a first output winding 524 and a second output winding 522.

Current from second output winding 522 is rectified by diode D1 526 to produce a reservoir voltage $V_{RES}$ 534 on a reservoir capacitor $C_{RES}$ 530. In other examples, diode D1 526 may be replaced by a switch driven by controller 562. A transistor switch that replaces diode D1 may be configured as a synchronous rectifier. Reservoir voltage $V_{RES}$ 534 is positive with respect to an output return 532. Transistor switch S2 528 conducts current from first output winding 524 to produce a regulated output voltage $V_O$ 546 on an output capacitor $C_O$ 536. Regulated output voltage $V_O$ 546 is also positive with respect to the output return 532. Output winding 522 and output winding 524 each have one end coupled at a common node in an arrangement that guarantees reservoir voltage $V_{RES}$ 534 is not less than regulated output voltage $V_O$ 546.

A regulator circuit 540 receives reservoir voltage $V_{RES}$ 534 to produce a regulator circuit output current $I_{RO}$ 538. A load 548 receives a load current $I_L$ 544 that is the sum of the regulator circuit output current $I_{RO}$ 538 and an output current $I_O$ 542 from the regulated output voltage $V_O$ 546.

Controller 562 includes an input controller 563 and an output controller 566. Input controller 563 is galvanically isolated from output controller 566 by a galvanic isolator 567 that may provide either unidirectional or bidirectional communication. Galvanic isolator 567 may rely on optical coupling, magnetic coupling, or capacitive coupling to achieve galvanically isolated communication between input controller 563 and output controller 566. In one example, controller 562 may include the FluxLink™ communication technology from Power Integrations, San Jose, Calif. to communicate across an isolation barrier within an integrated circuit without the use of magnetic materials.

In the example ac-dc power supply of FIG. 5, input controller 563 senses the rectified input voltage $V_{RECT}$ 512 as a current through resistor 578 at an input voltage sense terminal V 580. In one example, this sensing of the rectified input voltage $V_{RECT}$ 512 may be used to influence the switching of switch S1 516 by controller 563 such that the waveform of ac input current $I_{AC}$ 502 is substantially the same shape as the waveform of ac input voltage $V_{AC}$ 504. In another example, sensing of the rectified input voltage $V_{RECT}$ 512 may be used to provide protection modes such as shutting down controller 563 when input voltage 504 reaches excessively high values during, for example, lightning strikes on the utility supply rail. Input controller 563 switches a transistor switch S1 516 on and off to conduct a pulsating dc input current $I_{S1}$ 514 at a drain terminal D 576 of controller 562. Input capacitor $C_{IN}$ 510 filters the high frequency components of pulsating dc input current $I_{S1}$ 514 such that the magnitude of the ac input current $I_{AC}$ 504 at any instant is substantially the average of the pulsating dc input current $I_{S1}$ 514, the average taken over a switching period. Input controller 563 switches semiconductor switch S1 516 such that the waveform of ac input current $I_{AC}$ 502 is substantially the same shape as the waveform of ac input voltage $V_{AC}$ 504, and the average power from the ac input voltage $V_{AC}$ 504 is sufficient to provide the demand of the load 548 plus the power lost in the power conversion circuits. In other words, the ac input current $I_{AC}$ 502 is proportional to the ac input voltage $V_{AC}$ 504 so that the power supply operates with a relatively high power factor.

In the example ac-dc power supply of FIG. 5, output controller 566 senses regulated output voltage $V_O$ 546 at a first feedback terminal FB1 588 on controller 562 as a current in a resistor 572. Output controller 566 senses reservoir output voltage $V_{RES}$ 534 at a second feedback terminal FB2 590 on controller 562 as a current in a resistor 574. Output controller 566 senses the load current $I_L$ 544 as a voltage on a resistor 568 between a load return terminal RTN 569 and a ground GND terminal 594 on controller 562. Output controller 566 senses a voltage on the cathode of a diode D3 527 at a forward terminal FWD 584 on controller 562 as a current in a resistor 582. The voltage on the cathode of diode D3 527 is positive with respect to ground terminal GND 594 when switch S1 516 is conducting input current $I_{S1}$ 514. In other examples, diode D3 527 may be replaced by a switch driven by controller 562. A transistor switch that replaces diode D3 527 may be configured as a synchronous rectifier. Diode D2 570 across transistor switch S2 528 allows output winding 524 to conduct current to forward terminal FW 584 when transistor switch S1 516 is conducting input current $I_{S1}$ 514. In some examples, diode D2 570 may be an internal parasitic diode of transistor 528. In other examples, diode D2 570 may be a discrete diode.

In the example ac-dc power supply of FIG. 5, output controller 566 regulates either the output voltage $V_O$ 546 or the load current $I_L$ 544 by switching transistor switch S2 528 on and off with a drive signal from a first drive terminal DR1 586 on controller 562. Output controller 566 provides a drive signal from a second drive terminal DR2 592 on controller 562 to operate regulator circuit 540. Regulator circuit 540 in the example of FIG. 5 is configured as a switching converter known in the art as a buck converter. In operation, the voltage at the input ($V_{RES}$ 534) to a buck converter is greater than the voltage at the output ($V_O$ 546) of the buck converter. In other examples, where the reservoir voltage $V_{RES}$ 534 is less than the output voltage $V_O$ 546, regulator circuit 540 may be configured as another type of switching converter known as a boost converter. In yet other examples, regulator circuit 540 may be configured as other types of switching converters known in the art that can have their output voltage greater than or less than the input voltage.

The buck converter in the regulator circuit 540 of FIG. 5 may be operated in either a switching mode or a linear mode. The drive signal from drive terminal DR2 592 may be a switching signal to turn regulator transistor 541 on and off for operation in a switching mode. Alternatively, the drive signal from drive terminal DR2 592 may be a non-switching analog signal that operates regulator transistor 541 in a linear mode. In other words, regulator circuit 540 in the example of FIG. 5 may operate as either a switching regulator or a linear regulator, depending on the drive signal from drive terminal DR2 592. Controller 562 may select between operation in linear mode and operation in switching mode in response to input voltage and output load conditions to provide operation at highest system efficiency.

Figure 6:
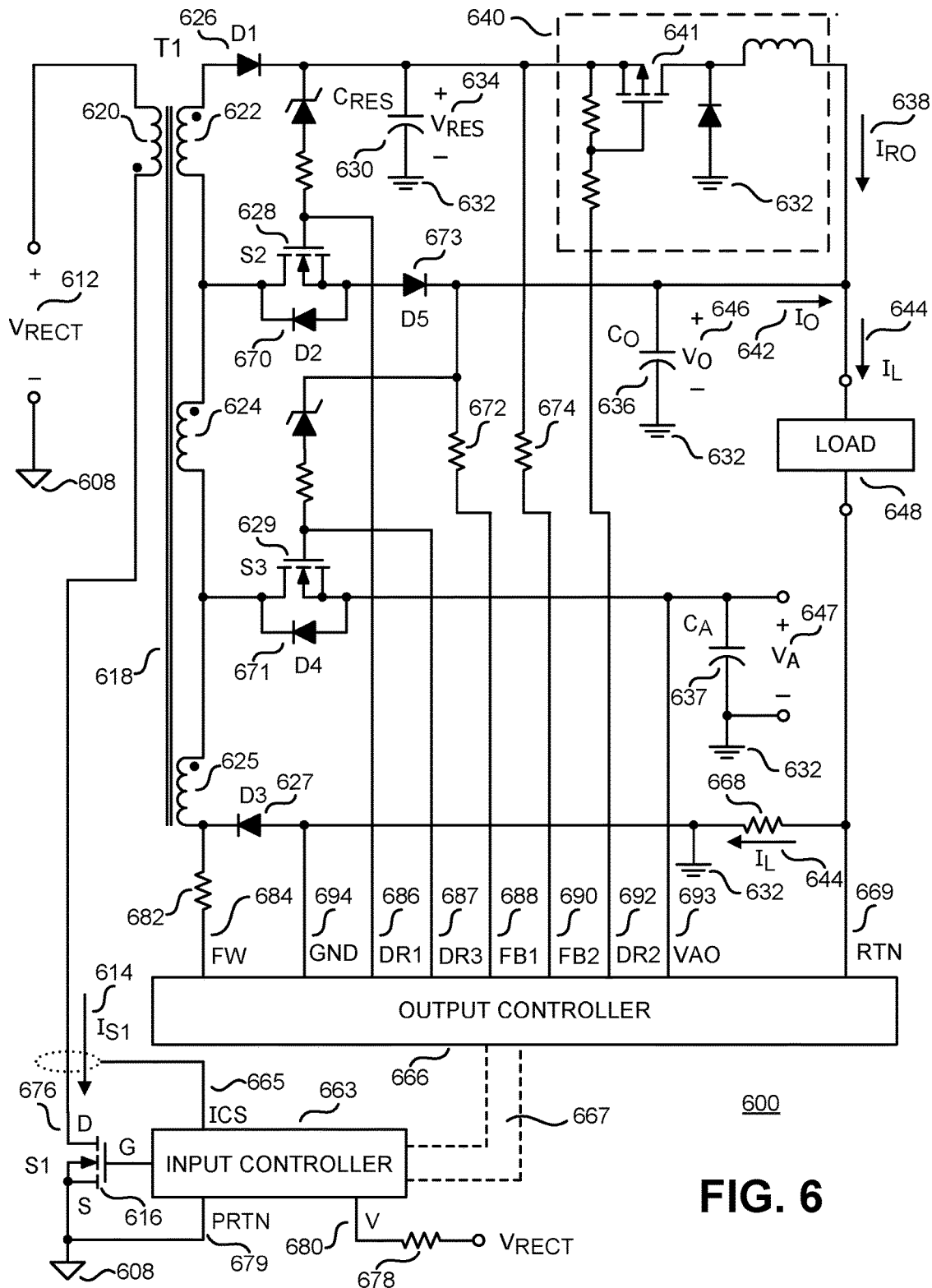
FIG. 6 is a schematic diagram that illustrates how the power supply of FIG. 5 may be extended to include multiple outputs in accordance with the teachings of the present invention.

FIG. 6 is a schematic diagram 600 of a flyback power supply that illustrates one example of how the power supply of FIG. 5 may be extended to include multiple outputs. Input winding 620 of energy transfer element T1 618 receives a rectified ac input voltage $V_{RECT}$ 612 that is positive with respect to an input return 608. Input winding 620 of energy transfer element T1 618 receives a current $I_{S1}$ 614 through switch S1. Energy transfer element T1 618 has a first output winding 624, a second output winding 622, and a third output winding 625. It is appreciated that the principle in accordance with the teachings of the present invention may be extended further to provide a plurality of regulated outputs that may be supplemented by a plurality of reservoir outputs and a plurality of regulator circuits.

Similar to the example of FIG. 5, an output controller 666 is galvanically isolated from an input controller 663 by a galvanic isolator 667 that may provide either unidirectional or bidirectional communication. In the example of FIG. 6, input controller is referenced to the input side of the power supply at a primary return terminal PRTN 679. Transistor switch S1 616, input controller 663, and output controller 666 may be any combination of integrated circuits and discrete devices, in a single package or in multiple packages.

Drain terminal 676 of transistor switch 616 receives a pulsating dc switch current $I_{S1}$ 614 as in the example of FIG. 5. Input controller 663 may receive a transistor switch current signal 665 at an input current sense terminal 665.

Current from second output winding 622 is rectified by diode D1 626 to produce a reservoir voltage $V_{RES}$ 634 on a reservoir capacitor $C_{RES}$ 630. In other examples, diode D1 626 may be replaced by a switch driven by output controller 666. A transistor switch that replaces diode D1 may be configured as a synchronous rectifier. Reservoir voltage $V_{RES}$ 634 is positive with respect to an output return 632. Transistor switch S2 628 conducts current from first output winding 624 to produce a regulated output voltage $V_O$ 646 on an output capacitor $C_O$ 636. Regulated output voltage $V_O$ 646 is also positive with respect to the output return 632. Output winding 622 and output winding 624 each have one end coupled at a common node in an arrangement that guarantees reservoir voltage $V_{RES}$ 634 is not less than regulated output voltage $V_O$ 646.

A regulator circuit 640 receives reservoir voltage $V_{RES}$ 634 to produce a regulator circuit output current $I_{RO}$ 638. A load 648 receives a load current $I_L$ 644 that is the sum of the regulator circuit output current $I_{RO}$ 638 and an output current $I_O$ 642 from the regulated output voltage $V_O$ 646.

Transistor switch S3 629 conducts current from third output winding 625 to produce an auxiliary regulated output voltage $V_A$ 546 on an auxiliary output capacitor $C_A$ 637. Auxiliary regulated output voltage $V_A$ 647 is positive with respect to the output return 632. Output winding 624 and output winding 625 each have one end coupled at a common node in an arrangement that guarantees output voltage $V_O$ 646 is not less than auxiliary regulated output voltage $V_A$ 647.

In the example ac-dc power supply of FIG. 6, input controller 663 senses the rectified input voltage $V_{RECT}$ 612 as a current through resistor 678 at an input voltage sense terminal V 680. In one example, this sensing of the rectified input voltage 612 may be used to influence the switching of switch S1 616 by controller 663 to achieve a relatively high power factor. In another example, sensing of the rectified input voltage $V_{RECT}$ 612 may be used to provide protection modes such as shutting down controller 663 when input rectified input voltage $V_{RECT}$ 612 reaches excessively high values during, for example, lightning strikes on the utility supply rail.

In the example power supply of FIG. 6, output controller 666 senses regulated output voltage $V_O$ 646 at a first feedback terminal FB1 688 as a current in a resistor 672. Output controller 666 senses reservoir output voltage $V_{RES}$ 634 at a second feedback terminal FB2 690 as a current in a resistor 674. Output controller 566 senses the load current $I_L$ 644 as a voltage on a resistor 668 between a load return terminal RTN 669 and a ground GND terminal 694. Output controller 666 senses a voltage on the cathode of a diode D3 627 at a forward terminal FWD 684 as a current in a resistor 682. The voltage on the cathode of diode D3 627 is positive with respect to ground terminal GND 694 when switch S1 616 is conducting input current $I_{S1}$ 614. In other examples, diode D3 627 may be replaced by a switch driven by output controller 666. A transistor switch that replaces diode D3 627 may be configured as a synchronous rectifier. Diode D2 670 across transistor switch S2 628 represents an internal parasitic diode of transistor 628. Diode D5 673 prevents the discharge of output capacitor $C_O$ 636 through parasitic diode D2 670.

In the example power supply of FIG. 6, output controller 666 senses regulated auxiliary output voltage $V_A$ 647 at a third feedback terminal VAO 693. In the example of FIG. 6, auxiliary output voltage $V_A$ 647 is low enough (e.g., not exceeding about 5 volts) to allow direct sensing by output controller 666, whereas regulated output voltage $V_O$ 646 and reservoir output voltage $V_{RES}$ 634 may typically be greater than 50 volts. Output controller 666 may be included within a low voltage integrated circuit.

In the example power supply of FIG. 6, output controller 666 regulates either the output voltage $V_O$ 646 or the load current $I_L$ 644 by switching transistor switch S2 628 on and off with a drive signal from a first drive terminal DR1 686 on output controller 666. Output controller 666 provides a drive signal from a second drive terminal DR2 692 to operate regulator circuit 640. Regulator circuit 640 in the example of FIG. 6 is configured as a switching converter known in the art as a buck converter. In operation, the voltage at the input ($V_{RES}$ 634) to a buck converter is greater than the voltage at the output ($V_O$ 646) of the buck converter. In other examples, where the reservoir voltage $V_{RES}$ 634 is less than the output voltage $V_O$ 646, regulator circuit 640 may be configured as another type of switching converter known as a boost converter. In yet other examples, regulator circuit 640 may be configured as other types of switching converters known in the art that can have their output voltage greater than or less than the input voltage. Output controller 666 regulates the regulated auxiliary output voltage $V_A$ 647 by switching transistor switch S3 628 on and off with a drive signal from a third drive terminal DR3 687.

Diode D4 671 across transistor switch S3 629 allows output winding 625 to conduct current to forward terminal FW 684 when transistor switch S1 616 is conducting input current $I_{S1}$ 614. In some examples, diode D4 671 may be an internal parasitic diode of transistor 629. In other examples, diode D4 671 may be a discrete diode.

Figure 7:
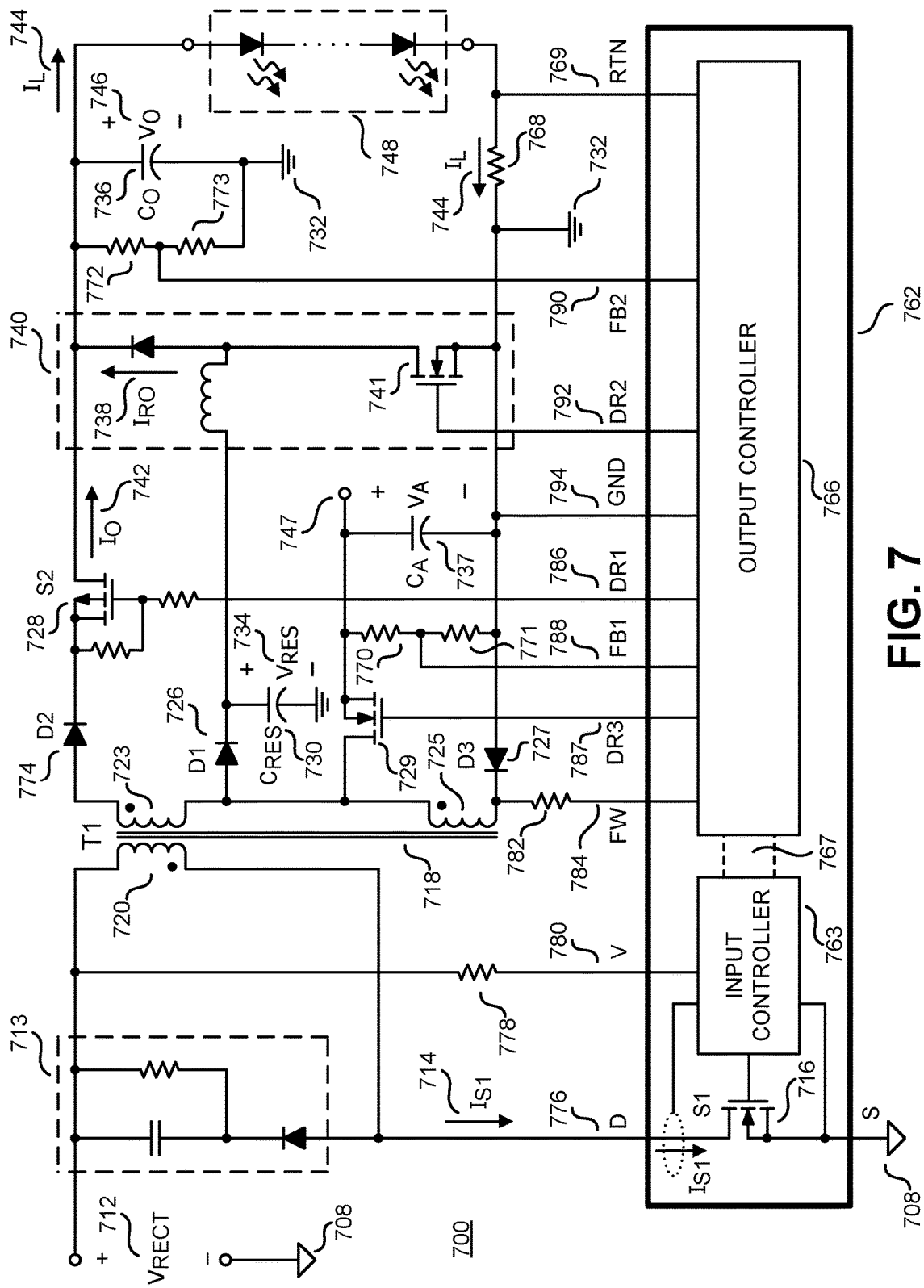
FIG. 7 is a schematic diagram of another example ac-dc power supply with multiple outputs in accordance with the teachings of the present invention.

FIG. 7 is a schematic diagram 700 of another example ac-dc power supply that includes a flyback converter showing details of a controller, a regulator circuit, switches, sensing circuits and an LED load. The example ac-dc power supply of FIG. 7 has many of the same features and elements as the examples of FIG. 5 and FIG. 6.

In the example ac-dc power supply of FIG. 7, an input winding 720 of an energy transfer element T1 718 receives a dc rectified input voltage $V_{RECT}$ 712 that is positive with respect to an input return 708. Energy transfer element T1 718 also has a first output winding 723 and a second output winding 725. In the example of FIG. 7, energy transfer element T1 718 provides galvanic isolation between the input return 708 and an output return 732.

Diode D2 774 and transistor switch S2 728 conduct a rectified output current $I_O$ 742 from first output winding 723 to charge an output capacitor $C_O$ 736 to a substantially dc output voltage $V_O$ 746 that is sufficient for an LED load 748 to conduct a regulated load current $I_L$ 744. Output voltage $V_O$ 746 is positive with respect to the output return 732.

Diode D1 726 rectifies current from second output winding 725 to produce a reservoir voltage $V_{RES}$ 734 on a reservoir capacitor $C_{RES}$ 730. Reservoir voltage $V_{RES}$ 734 is positive with respect to the output return 732. In the example of FIG. 7, output windings 723 and 725 are configured to produce an output voltage $V_O$ 746 that is greater than the reservoir voltage $V_{RES}$ 734. A regulator circuit 740 receives reservoir voltage $V_{RES}$ 734 to produce a regulator circuit output current $I_{RO}$ 738. In the example of FIG. 7, regulator circuit 740 is configured as a boost converter that delivers its output current $I_{RO}$ 738 to an output voltage $V_O$ 746 that is greater than its input voltage $V_{RES}$ 734.

Transistor switch 729 conducts current from second output winding 725 to produce a regulated auxiliary output voltage $V_A$ 747 on an auxiliary output capacitor $C_A$ 737. Regulated auxiliary voltage $V_A$ 747 is positive with respect to the output return 732. In one example, regulated auxiliary voltage $V_A$ 747 may be approximately 5 volts, output voltage $V_O$ 746 may be approximately 50 volts, and the reservoir voltage $V_{RES}$ 734 may vary between approximately 10 volts and approximately 40 volts.

Controller 762 includes an input controller 763 and an output controller 766. Input controller 763 is galvanically isolated from output controller 766 by a galvanic isolator 767 that may provide unidirectional or bidirectional communication. Galvanic isolator 767 may rely on optical coupling, magnetic coupling, or capacitive coupling to achieve galvanically isolated communication between input controller 763 and output controller 766. In one example, controller 762 may include the FluxLink™ communication technology from Power Integrations, San Jose, Calif. to communicate across an isolation barrier within an integrated circuit without the use of magnetic materials.

In the example ac-dc power supply of FIG. 7, input controller 763 senses the rectified input voltage $V_{RECT}$ 712 as a current through resistor 778 at an input voltage sense terminal V 780. In one example, this sensing of the rectified input voltage $V_{RECT}$ 712 may be used to influence the switching of switch S1 716 by controller 763 to achieve a relatively high power factor at the ac input to the power supply, not shown in FIG. 7. In another example, sensing of the rectified input voltage $V_{RECT}$ 712 may be used to provide protection modes such as shutting down controller 763 when the rectified input voltage $V_{RECT}$ 712 reaches excessively high values during, for example, lightning strikes on the utility supply rail. Input controller 763 switches a transistor switch S1 716 on and off to conduct a pulsating dc input current $I_{S1}$ 714 at a drain terminal D 776 of controller 762. A clamp circuit 713 protects transistor switch S1 716 from potentially damaging voltage that may appear at the input winding 720 of energy transfer element T1 718 when transistor switch S1 716 turns off. Input controller 763 switches transistor switch S1 716 such that the power supply operates with a relatively high power factor.

In the example ac-dc power supply of FIG. 7, output controller 766 senses auxiliary output voltage $V_A$ 747 at a first feedback terminal FB1 788 on controller 762 with voltage divider resistors 770 and 771. Output controller 766 senses regulated output voltage $V_O$ 746 at a second feedback terminal FB2 790 on controller 762 with voltage divider resistors 772 and 773. Output controller 766 senses the load current $I_L$ 744 as a voltage on a resistor 768 between a load return terminal RTN 769 and a ground GND terminal 794 on controller 762. Output controller 766 senses a voltage on the cathode of a diode D3 727 at a forward terminal FWD 784 on controller 762 as a current in a resistor 782. The voltage on the cathode of diode D3 727 is positive with respect to ground terminal GND 794 when transistor switch S1 716 is conducting input current $I_{S1}$ 714. In other examples, diode D3 727 may be replaced by a switch driven by controller

762. A transistor switch that replaces diode D3 727 may be configured as a synchronous rectifier.

In the example ac-dc power supply of FIG. 7, output controller 766 regulates either the output voltage $V_O$ 746 or the load current $I_L$ 744 by switching transistor switch S2 728 on and off with a drive signal from a first drive terminal DR1 786 on controller 762. Output controller 766 provides a drive signal from a second drive terminal DR2 792 on controller 762 to operate transistor switch 741 in regulator circuit in 740. Regulator circuit 740 in the example of FIG. 7 is configured as a switching converter known in the art as a boost converter. In operation, the voltage at the input ($V_{RES}$ 734) to a boost converter is less than the voltage at the output ($V_O$ 746) of the boost converter. In FIG. 7, switch S2 728 is shown as a p-channel metal-oxide semiconductor field effect transistor (MOSFET) but it will be appreciated by one skilled in the art that in other examples an n-channel MOSFET could be used and driven by controller 766 in a variety of ways including the use of charge pumps or auxiliary transformer windings to provide the drive voltage required.

Figure 8:
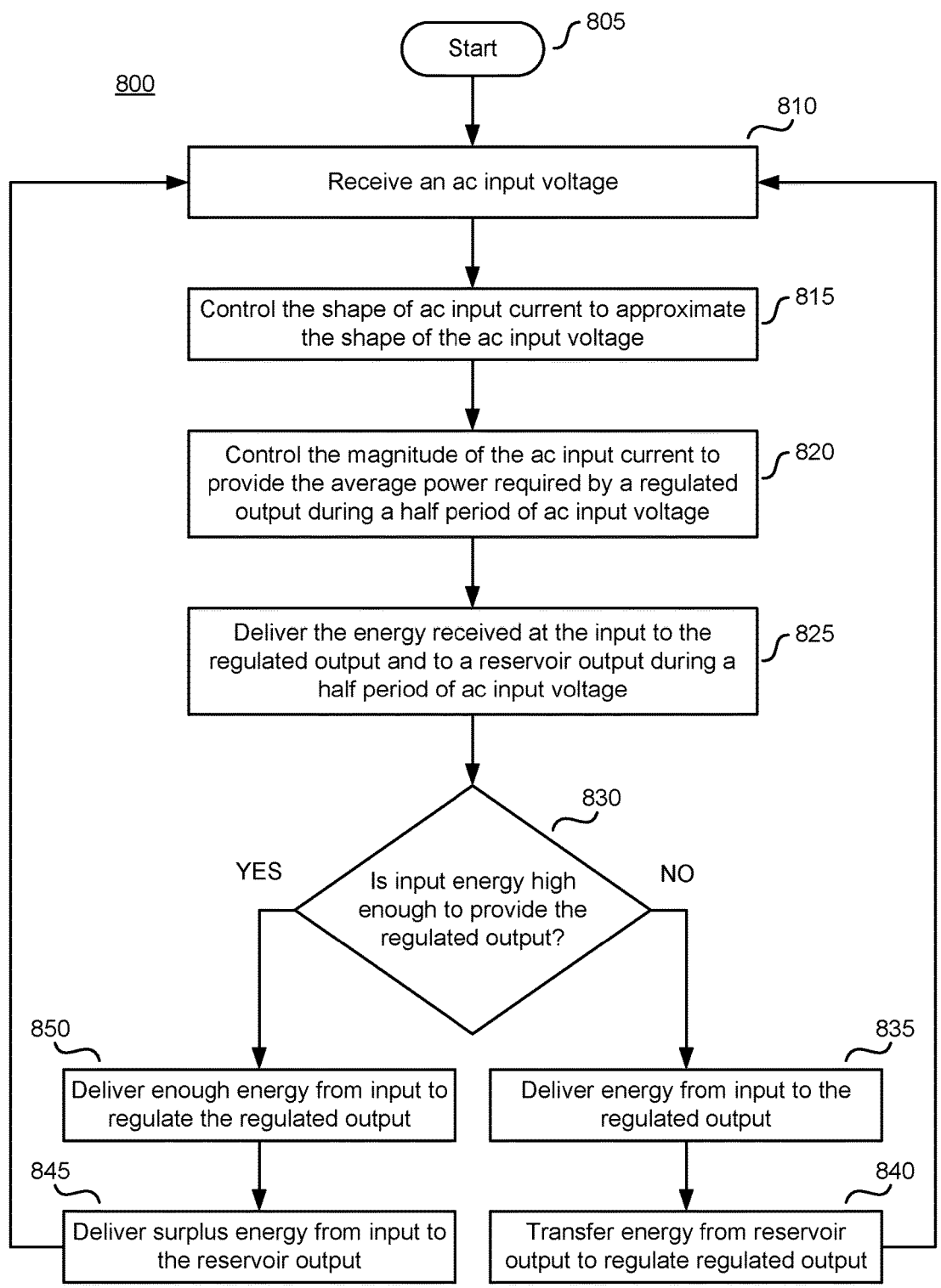
FIG. 8 is a flow diagram illustrating a method to provide a regulated output from a single-stage ac-dc power supply with power factor correction and an output-referenced energy reservoir, in accordance with the teachings of the present invention.

FIG. 8 is a flow diagram 800 that describes a method to provide a regulated output from a single-stage ac-dc power supply with power factor correction and an output-referenced energy reservoir.

After starting in step 805 the power supply receives an ac input voltage. The power supply then controls the shape of the ac input current in step 815 to approximate the shape of the ac input voltage so that the power supply may operate with a high power factor. In a power supply with power factor correction, the magnitude of the input current must be adjusted to provide the required output power.

Next, in step 820, the power supply sets the ratio between the ac input current and the ac input voltage to provide the average power required by a regulated output during a half period of the ac input voltage. The ratio typically remains substantially fixed for at least the duration of one half period of the ac input voltage so that the ac input current approximates the shape of the ac input voltage. Since the input power is not constant throughout one half period of the ac input voltage, power greater than the average load power must be diverted from the regulated output, and power less than the average load power must be supplemented. The power supply includes a reservoir output to store and release the energy associated with the input power that differs from the average power required by the load.

In step 825 the power supply delivers the energy received at the input to the regulated output and to a reservoir output during each half period of the ac input voltage. The power supply determines how the input energy is apportioned in step 830. If the input energy is high enough to provide the regulated output, the flow goes to step 850 where the energy required by the regulated output is delivered to the regulated output, and then to step 845 where surplus energy is delivered to the reservoir output. If the input energy is not high enough to provide the regulated output, the flow goes to step 835 where all the energy from the input is delivered to the regulated output and energy is transferred from the reservoir output to regulate the regulated output in step 840. From blocks 840 and 845, the process returns to step 810 and continues.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. An ac-dc power supply, comprising:
    a dc-dc converter coupled to an input of the ac-dc power supply, wherein the dc-dc converter includes an energy transfer element including a primary winding, a first output winding, and a second output winding, wherein the primary winding is coupled to the input of the ac-dc power supply, wherein the input of the ac-dc power supply is coupled to receive an ac input voltage and an ac input current, wherein the dc-dc converter includes a regulated output coupled to the first output winding, and a reservoir output coupled to the second output winding;
    a controller coupled to receive sense signals from the dc-dc converter, wherein the controller is coupled to control the dc-dc converter to regulate the regulated output in response to the sense signals such that the first output winding is coupled to charge the regulated output to an output voltage that is positive with respect to an output return, and such that the second output winding is coupled to charge the reservoir output to a reservoir voltage that is positive with respect to the output return, wherein the controller is further coupled to control a waveform of the ac input current to have a substantially same shape as a waveform of the ac input voltage; and
    a regulator circuit coupled to the regulated output and the reservoir output, wherein the controller is coupled to the regulator circuit to control a transfer of energy from the reservoir output to the regulated output through the regulator circuit to regulate the regulated output if input energy received at the input of the ac-dc power supply is not high enough to provide the regulated output of the ac-dc power supply through the first output winding.

2. The ac-dc power supply of claim 1, further comprising a rectifier coupled to the input of the ac-dc power supply and the dc-dc converter, wherein the rectifier is coupled to provide a dc input voltage and a dc input current to the dc-dc converter.

3. The ac-dc power supply of claim 1, wherein the regulated output and the reservoir output are galvanically isolated from the input of the ac-dc power supply.

4. The ac-dc power supply of claim 3, wherein the regulator circuit is a linear regulator.

5. The ac-dc power supply of claim 3, wherein the regulator circuit is a switching regulator.

6. The ac-dc power supply of claim 5, wherein the regulator circuit is a buck converter.

7. The ac-dc power supply of claim 6, wherein the buck converter is coupled to receive a regulator circuit drive signal from the controller to operate as a switching regulator.

8. The ac-dc power supply of claim 6, wherein the buck converter is coupled to receive a regulator circuit drive signal from the controller to operate as a linear regulator.

9. The ac-dc power supply of claim 5, wherein the regulator circuit is a boost converter.

10. The ac-dc power supply of claim 3, wherein the dc-dc converter is a flyback converter.

11. The ac-dc power supply of claim 3, wherein the regulator circuit is coupled to receive a regulator circuit drive signal from the controller.

12. The ac-dc power supply of claim 3, wherein the controller comprises:
an input controller coupled to provide a first drive signal to an input switch coupled to the primary winding of the energy transfer element of the dc-dc converter; and
an output controller coupled to provide a second drive signal to an output switch coupled to the first output winding of the energy transfer element of the dc-dc converter.

13. The ac-dc power supply of claim 12, wherein input controller is galvanically isolated from the output controller.

14. The ac-dc power supply of claim 1, wherein the regulated output is coupled to provide power to a load, wherein the ac-dc power supply further comprises a reservoir capacitor coupled to the reservoir output, wherein the reservoir output is coupled to charge the reservoir capacitor when an instantaneous power received from the input of the ac-dc power supply is greater than a power received by the load, and wherein the reservoir output is coupled to discharge the reservoir capacitor when the instantaneous power received from the input of the ac-dc power supply is less than the power received by the load.

15. The ac-dc power supply of claim 1, wherein the sense signals received by the controller from the dc-dc converter include an output voltage sense signal, a reservoir voltage sense signal, an input voltage sense signal, and an input current sense signal.

16. A method of providing a regulated output of an ac-dc power supply, comprising:
receiving an ac input voltage at an input of the ac-dc power supply;
rectifying the ac input voltage of the ac-dc power supply;
controlling a shape of an ac input current to approximate a shape of an ac input voltage;
controlling a magnitude of the ac input current to provide an average power required by a regulated output during a half period of the ac input voltage;
delivering energy received at the input of the ac-dc power supply to the regulated output of the ac-dc power supply through a first output winding of an energy transfer element, and to a reservoir output of the ac-dc power supply through a second output winding of the energy transfer element during the half period of the ac input voltage;
delivering enough energy from the input of the ac-dc power supply to regulate the regulated output of the ac-dc power supply through the first output winding to charge the regulated output to an output voltage that is positive respect to an output return, and delivering surplus energy from the input of the ac-dc power supply to the reservoir output of the ac-dc power supply through the second output winding to charge the reservoir output to a reservoir voltage that is positive with respect to the output return if the energy received at the input of the ac-dc power supply is enough to provide the regulated output of the ac-dc power supply; and
delivering energy from the input of the ac-dc power supply to the regulated output of the ac-dc power supply through the first output winding, and transferring energy from the reservoir output of the ac-dc power supply to regulate the regulated output of the ac-dc power supply if the input energy received at the input of the ac-dc power supply is not high enough to provide the regulated output of the ac-dc power supply through the first output winding.

17. The method of claim 16, wherein said transferring energy from the reservoir output of the ac-dc power supply to regulate the regulated output of the ac-dc power supply comprises discharging a reservoir capacitor coupled to the reservoir output of the ac-dc power supply to the output of the ac-dc power supply to regulate the output of the ac-dc power supply.

18. The method of claim 16, further comprising:
sensing an input voltage of the ac-dc power supply;
sensing an input current of the ac-dc power supply;
sensing an output voltage of the ac-dc power supply; and
sensing a reservoir voltage of the ac-dc power supply.

19. The method of claim 16, further comprising:
sensing an input voltage of the ac-dc power supply;
sensing an input current of the ac-dc power supply;
sensing an output current of the ac-dc power supply; and
sensing a reservoir voltage of the ac-dc power supply.

20. The method of claim 16, further comprising galvanically isolating the input of the ac-dc power supply from the regulated output of the ac-dc power supply and from the reservoir output of the ac-dc power supply.

21. The method of claim 16, wherein said delivering surplus energy from the input of the ac-dc power supply to the reservoir output of the ac-dc power supply comprises charging a reservoir capacitor coupled to the reservoir output of the ac-dc power supply with the surplus energy from the input of the ac-dc power supply.

22. A controller for use in an ac-dc power supply, comprising:
a sense signal input coupled to receive a sense signal from a dc-dc converter, wherein the dc-dc converter is coupled to an input of the ac-dc power supply, wherein the input of the ac-dc power supply is coupled to receive an ac input voltage and an ac input current, wherein the dc-dc converter includes an energy transfer element including a primary winding, a first output winding, and a second output winding, wherein the primary winding is coupled to the input of the ac-dc power supply, wherein the dc-dc converter includes a regulated output coupled to the first output winding, and a reservoir output coupled to the second output winding;
a drive signal output coupled to the dc-dc converter, wherein the drive signal output is coupled to control the dc-dc converter to regulate the regulated output in response to the sense signal such that the first output winding is coupled to charge the regulated output to an output voltage that is positive with respect to an output return, and such that the second output winding is coupled to charge the reservoir output to a reservoir voltage that is positive with respect to the output return, wherein the drive signal output is further coupled to control a waveform of the ac input current to have a substantially same shape as a waveform of the ac input voltage; and
a regulator circuit drive signal output coupled to a regulator circuit, wherein the regulator circuit is coupled to the regulated output and the reservoir output, wherein the regulator circuit drive signal output is coupled to control a transfer of energy from the reservoir output to the regulated output through the regulator circuit to regulate the regulated output if input energy received at the input of the ac-dc power supply is not high enough to provide the regulated output through the first output winding.

23. The controller of claim 22, wherein the regulator circuit is a linear regulator.

24. The controller of claim 22, wherein a rectifier is coupled to the input of the ac-dc power supply and the dc-dc converter, wherein the rectifier is coupled to provide a dc input voltage and a dc input current to the dc-dc converter.

25. The controller of claim 22, wherein the regulated output and the reservoir output are galvanically isolated from the input of the ac-dc power supply.

26. The controller of claim 25, wherein the dc-dc converter is a flyback converter.

27. The controller of claim 25, further comprising:
an input controller coupled to provide a first drive signal through the drive signal output to an input switch coupled to the primary winding of the energy transfer element of the dc-dc converter; and
an output controller coupled to provide a second drive signal through the drive signal output to an output switch coupled to the first output winding of the energy transfer element of the dc-dc converter.

28. The controller of claim 27, wherein the input controller is galvanically isolated from the output controller.

29. The controller of claim 22, wherein the regulator circuit is a switching regulator.

30. The controller of claim 29, wherein the regulator circuit is a buck converter.

31. The controller of claim 30, wherein the buck converter is coupled to receive a regulator circuit drive signal from the regulator circuit drive signal output to operate as a switching regulator.

32. The controller of claim 30, wherein the buck converter is coupled to receive a regulator circuit drive signal from the regulator circuit drive signal output to operate as a linear regulator.

33. The controller of claim 29, wherein the regulator circuit is a boost converter.

34. The controller of claim 22, wherein the regulator circuit is coupled to receive a regulator circuit drive signal from the regulator circuit drive signal output.

35. The controller of claim 22, wherein the sense signal received by the sense signal input from the dc-dc converter is one of a plurality of sense signals received at a plurality of sense signal inputs, and wherein the sense signals include an output voltage sense signal, a reservoir voltage sense signal, an input voltage sense signal, and an input current sense signal.

36. The controller of claim 22, wherein the sense signal received by the sense signal input from the dc-dc converter is one of a plurality of sense signals received at a plurality of sense signal inputs, and wherein the sense signals include an output current sense signal, a reservoir voltage sense signal, an input voltage sense signal, and an input current sense signal.

37. The controller of claim 22, wherein the regulated output is coupled to provide power to a load, wherein the ac-dc power supply further comprises a reservoir capacitor coupled to the reservoir output, wherein the reservoir output is coupled to charge the reservoir capacitor when an instantaneous power received from the input of the ac-dc power supply is greater than a power received by the load, and wherein the reservoir output is coupled to discharge the reservoir capacitor when the instantaneous power received from the input of the ac-dc power supply is less than the power received by the load.

38. The controller of claim 37, wherein the controller is coupled to temporarily suspend control of the waveform of the ac input current to have a substantially same shape as a waveform of the ac input voltage when the voltage on the reservoir capacitor exceeds a maximum value.

39. The controller of claim 37, wherein the controller is coupled to temporarily suspend control of the waveform of the ac input current to have a substantially same shape as a waveform of the ac input voltage when the voltage on the reservoir capacitor is less than a minimum value.

* * * * *